US011635904B2

(12) United States Patent
Ruan et al.

(10) Patent No.: US 11,635,904 B2
(45) Date of Patent: Apr. 25, 2023

(54) MATRIX STORAGE METHOD, MATRIX ACCESS METHOD, APPARATUS AND ELECTRONIC DEVICE

(71) Applicant: Beijing Baidu Netcom Science and Technology Co., Ltd., Beijing (CN)

(72) Inventors: Yuan Ruan, Beijing (CN); Haoyang Li, Beijing (CN)

(73) Assignee: KUNLUNXIN TECHNOLOGY (BEIJING) COMPANY LIMITED, Beijing (CN)

( * ) Notice: Subject to any disclaimer, the term of this patent is extended or adjusted under 35 U.S.C. 154(b) by 0 days.

(21) Appl. No.: 16/908,707

(22) Filed: Jun. 22, 2020

(65) Prior Publication Data
US 2021/0200439 A1 Jul. 1, 2021

(30) Foreign Application Priority Data
Dec. 31, 2019 (CN) .......................... 201911420575.8

(51) Int. Cl.
G06F 12/00 (2006.01)
G06F 13/00 (2006.01)
G06F 3/06 (2006.01)

(52) U.S. Cl.
CPC ............ G06F 3/064 (2013.01); G06F 3/0622 (2013.01); G06F 3/0647 (2013.01); G06F 3/0659 (2013.01); G06F 3/0683 (2013.01)

(58) Field of Classification Search
CPC ...... G06F 3/064; G06F 3/0622; G06F 3/0647; G06F 3/059; G06F 3/0683
(Continued)

(56) References Cited

U.S. PATENT DOCUMENTS

| 5,384,890 A | * | 1/1995 | Anderson | ............... G06F 16/40 704/200 |
| 5,724,086 A | * | 3/1998 | Mackin | ............... G06K 15/028 347/237 |

(Continued)

FOREIGN PATENT DOCUMENTS

| CN | 103927270 A | 7/2014 |
| CN | 104899182 A | 9/2015 |

(Continued)

OTHER PUBLICATIONS

First Office Action issued from the State Intellectual Property Office of People's Republic of China to CN Application No. 201911420575.8 dated Feb. 20, 2021, 12 pages.

(Continued)

*Primary Examiner* — Sheng Jen Tsai
(74) *Attorney, Agent, or Firm* — Hunton Andrews Kurth LLP (57) ABSTRACT

The present disclosure relates to technical field of data access, and discloses a matrix storage method, a matrix access method, an apparatus and an electronic device in the technical field of data access. The matrix storage method includes: dividing a matrix into a plurality of data blocks with a preset segmentation granularity of N rows×M columns; the plurality of data blocks includes at least one first data block of N rows×M columns; if the column number of the matrix is not an integer multiple of M, the plurality of data blocks further includes at least one second data block of N rows×P columns, the second data block is aligned with an adjacent row of first data block; and storing the data in each of the first data blocks and the second data blocks continuously in an off-chip storage.

20 Claims, 6 Drawing Sheets

(58) Field of Classification Search
USPC .......................................................... 711/154
See application file for complete search history.

(56) References Cited

U.S. PATENT DOCUMENTS

| | | | | |
|---|---|---|---|---|
| 5,808,655 | A * | 9/1998 | Haas | G06K 15/029 347/234 |
| 5,848,295 | A * | 12/1998 | Anderson | G06F 9/5016 719/312 |
| 5,881,179 | A * | 3/1999 | Gillard | H04N 19/63 382/265 |
| 5,955,691 | A * | 9/1999 | Suzuki | G10H 7/006 84/622 |
| 6,137,046 | A * | 10/2000 | Kamiya | G10H 7/02 84/603 |
| 7,660,911 | B2 * | 2/2010 | McDaniel | G06F 13/4027 710/33 |
| 9,886,418 | B2 | 2/2018 | Yang et al. | |
| 10,095,436 | B2 * | 10/2018 | Im | G06F 12/0895 |
| 2007/0094484 | A1 * | 4/2007 | Rychlik | G06F 9/30134 712/228 |
| 2007/0104078 | A1 * | 5/2007 | Yin | G11B 19/045 |
| 2007/0106885 | A1 * | 5/2007 | Rychlik | G06F 9/30101 712/228 |
| 2008/0010473 | A1 * | 1/2008 | Harris | G06F 1/3203 713/300 |
| 2008/0126704 | A1 * | 5/2008 | Ulrich | G06F 11/1076 711/E12.001 |
| 2008/0207147 | A1 * | 8/2008 | Rofougaran | H03F 1/0294 455/114.2 |
| 2008/0260023 | A1 * | 10/2008 | Sung | H04N 19/428 375/240.03 |
| 2008/0282074 | A1 * | 11/2008 | Jacobowitz | G06F 1/3243 713/1 |
| 2009/0002761 | A1 * | 1/2009 | La | G06F 13/28 358/1.16 |
| 2010/0318310 | A1 * | 12/2010 | Thomas | H01L 22/20 702/107 |
| 2011/0090734 | A1 * | 4/2011 | Burger, Jr. | G06F 11/1072 365/185.03 |
| 2011/0119467 | A1 * | 5/2011 | Cadambi | G06N 20/10 712/27 |
| 2012/0106287 | A1 | 5/2012 | Catovic et al. | |
| 2012/0311264 | A1 * | 12/2012 | Wei | G06F 13/1673 711/E12.017 |
| 2013/0339640 | A1 | 12/2013 | Cho | |
| 2014/0281147 | A1 * | 9/2014 | Yoshimura | G06F 12/0246 711/103 |
| 2014/0289445 | A1 * | 9/2014 | Savich | G06F 17/16 710/317 |
| 2014/0372680 | A1 * | 12/2014 | Tsai | G06F 13/4239 711/103 |
| 2015/0067123 | A1 * | 3/2015 | Goyal | H04L 63/1408 709/223 |
| 2015/0080703 | A1 * | 3/2015 | Reiman | G01N 33/5088 600/409 |
| 2015/0142722 | A1 * | 5/2015 | Sung | G06N 7/005 706/52 |
| 2015/0309221 | A1 | 10/2015 | Li et al. | |
| 2016/0098209 | A1 | 4/2016 | Leidel et al. | |
| 2016/0217367 | A1 * | 7/2016 | Moreno | G10L 15/16 |
| 2016/0314833 | A1 * | 10/2016 | Lee | G11C 16/08 |
| 2017/0064309 | A1 * | 3/2017 | Sethuraman | H04N 19/159 |
| 2017/0344479 | A1 * | 11/2017 | Boyer | G06F 12/0817 |
| 2018/0032336 | A1 * | 2/2018 | Qi | G06F 9/3881 |
| 2018/0157962 | A1 | 6/2018 | Henry et al. | |
| 2018/0183547 | A1 * | 6/2018 | Huebner | H04L 1/1812 |
| 2018/0232181 | A1 * | 8/2018 | Zhou | G06F 3/0679 |
| 2018/0293691 | A1 * | 10/2018 | Nurvitadhi | G06N 3/084 |
| 2018/0321938 | A1 * | 11/2018 | Boswell | G06F 9/3012 |
| 2018/0322381 | A1 * | 11/2018 | Liu | G06N 3/063 |
| 2019/0018766 | A1 | 1/2019 | Guo et al. | |
| 2019/0056498 | A1 * | 2/2019 | Sonn | G01S 17/931 |
| 2019/0155774 | A1 * | 5/2019 | Suzuki | G06F 13/4022 |
| 2019/0317901 | A1 * | 10/2019 | Kachare | G06F 12/1009 |
| 2019/0392297 | A1 * | 12/2019 | Lau | G06N 3/0454 |
| 2020/0050918 | A1 * | 2/2020 | Chen | G06N 3/08 |
| 2020/0057938 | A1 | 2/2020 | Lu et al. | |
| 2020/0065639 | A1 * | 2/2020 | Li | G06F 3/0658 |
| 2020/0097793 | A1 * | 3/2020 | Chen | G06N 3/063 |
| 2020/0125335 | A1 * | 4/2020 | Neoh | G06F 7/78 |
| 2020/0159812 | A1 * | 5/2020 | Zarar | G06F 7/5443 |
| 2020/0293105 | A1 * | 9/2020 | Ambardekar | G06F 1/329 |
| 2020/0311530 | A1 * | 10/2020 | Wen | G06N 3/04 |
| 2020/0320605 | A1 * | 10/2020 | Li | H04L 63/0428 |
| 2020/0334322 | A1 * | 10/2020 | Liu | G06F 17/16 |
| 2021/0035258 | A1 * | 2/2021 | Ray | G06F 15/8046 |

FOREIGN PATENT DOCUMENTS

| | | |
|---|---|---|
| CN | 105912476 A | 8/2016 |
| CN | 103514100 B | 1/2018 |
| CN | 108765247 A | 11/2018 |
| CN | 108875077 A | 11/2018 |
| CN | 108984280 A | 12/2018 |
| CN | 110390075 A | 10/2019 |
| EP | 1713083 A1 | 10/2006 |
| JP | H07210672 A | 8/1995 |
| JP | 2007249262 A | 9/2007 |
| WO | 2007063501 A2 | 6/2007 |
| WO | 2018196863 A1 | 11/2018 |
| WO | 2019128404 A1 | 7/2019 |

OTHER PUBLICATIONS

Japanese Office Action issued from the Japan Patent Office to JP Application No. 2020-105553 dated Aug. 17, 2021, 7 pages.
Korean Office Action issued from the Korea Intellectual Property Office to KR Application No. 10-2020-0076140 dated Aug. 25, 2021, 8 pages.
Second Chinese Office Action, issued from The State Intellectual Property Office of People's Republic of China, to CN Application No. 201911420575.8 dated May 25, 2021, 17 pages.
Extended European Search Report, issued from the European Patent Office, to EP Application No. 20180541.3 dated Dec. 14, 2020, 9 pages.
Japanese Office Action, issued from the Japan Patent Office, to JP Application No. 2020-105553 dated Jun. 28, 2022, 5 pages.

* cited by examiner

MATRIX STORAGE METHOD, MATRIX ACCESS METHOD, APPARATUS AND ELECTRONIC DEVICE

CROSS-REFERENCE TO RELATED APPLICATION

The present claims the priority of China Patent Application No. 201911420575.8, filed on Dec. 31, 2019, the entirety of which is hereby incorporated by reference herein.

TECHNICAL FIELD

The present disclosure relates to data processing technology, in particular to a matrix storage method, a matrix access method, an apparatus and an electronic device in the technical field of data access.

BACKGROUND

Neural network is widely used in artificial intelligence applications, such as speech recognition, image recognition and so on. The operation process of neural network typically involves a large amount of matrix operations. With the increase of the storage space required by the neural network operation process, Neural-network Processing Unit (NPU) is usually equipped with off-chip storage in addition to on-chip storage. In this way, the matrix to be processed can be first stored in the off-chip storage, and then the matrix stored in the off-chip storage can be loaded to the on-chip storage on demand. At present, the matrix is usually stored in a manner of row storage or column storage, while NPU does not load data based on the present storage manner, which lowers the matrix processing efficiency of NPU.

SUMMARY

The present application provides a matrix storage method, a matrix access method, an apparatus and an electronic device to solve the problem of low matrix processing efficiency of the NPU.

In order to solve the above technical problems, the present application is realized as follows:

In a first aspect, the present application provides a matrix storage method, including:

dividing a matrix into a plurality of data blocks with a preset segmentation granularity of N rows×M columns, at least one of N and M is greater than 1; the plurality of data blocks includes at least one first data block of N rows×M columns; if the column number of the matrix is not an integer multiple of M, the plurality of data blocks further includes at least one second data block of N rows×P columns, the second data block is aligned with an adjacent row of first data block, and P is less than M;

storing the data in each of the first data blocks continuously in an off-chip storage, and storing the data in each of the second data blocks continuously in the off-chip storage.

Optionally, if the row number of the matrix is not an integer multiple of N, the plurality of data blocks further include at least one third data block of L rows×S columns, and L is less than N.

Optionally, the number of the third data block is 1, and S is equal to the column number of the matrix.

Optionally, the method further includes:

storing the data in each of the third data blocks continuously in the off-chip storage.

Optionally, if the off-chip storage includes a plurality of storage channels, the segmentation granularity is an integral multiple of a storage granularity of each storage channel.

In a second aspect, the present application provides a matrix access method, wherein the matrix is stored in an off-chip storage using a matrix storage method according to the first aspect, and the method includes:

receiving an access request for the matrix, wherein the access request includes access parameters of the matrix;

if the data block corresponding to the access parameter includes a complete first data block or a complete second data block, reading the data of the data block from the off-chip storage;

if the data block corresponding to the access parameter includes an incomplete first data block or an incomplete second data block, reading the data of the data block from the off-chip storage is prohibited.

In a third aspect, the present application provides a matrix storage apparatus, which includes:

a segmentation module for dividing a matrix into a plurality of data blocks with a preset segmentation granularity of N rows×M columns, at least one of N and M is greater than 1; the plurality of data blocks includes at least one first data block of N rows×M columns; if the column number of the matrix is not an integer multiple of M, the plurality of data blocks further includes at least one second data block of N rows×P columns, the second data block is aligned with an adjacent row of first data block, and P is less than M;

a first storage module for storing the data in each of the first data blocks continuously in an off-chip storage, and storing the data in each of the second data blocks continuously in the off-chip storage.

Optionally, if the row number of the matrix is not an integer multiple of N, the plurality of data blocks further include at least one third data block of L rows×S columns, and L is less than N.

Optionally, the number of the third data block is 1, and S is equal to the column number of the matrix.

Optionally, the apparatus further includes:

a second storage module for storing the data in each of the third data blocks continuously in the off-chip storage.

Optionally, if the off-chip storage includes a plurality of storage channels, the segmentation granularity is an integral multiple of a storage granularity of each storage channel.

In a fourth aspect, the present application provides a matrix access apparatus for accessing the matrix stored in the matrix storage apparatus according to the third aspect, the matrix access apparatus includes:

a receiving module for receiving an access request for the matrix, wherein the access request includes access parameters of the matrix;

a reading module for reading the data of the data block from the off-chip storage if the data block corresponding to the access parameter includes a complete first data block or a complete second data block;

a control module for prohibiting reading the data of the data block from the off-chip storage if the data block corresponding to the access parameter includes an incomplete first data block or an incomplete second data block.

In a fifth aspect, the present application provides an electronic device, including:

at least one processor; and a memory which is connected to and in communication with the at least one processor; wherein, instructions that can be executed by the at least one processor are stored in the memory, the instructions are executed by the at least one processor to enable the at least one processor to perform any one of the methods according to the first aspect.

In a sixth aspect, the present application provides a non-transient computer-readable storage medium having computer instructions stored thereon, wherein the computer instructions are executed to cause the computer to perform any one of the methods according to the first aspect.

The advantages or beneficial effects of the embodiments in the present application will be described below in conjunction with specific embodiments.

BRIEF DESCRIPTION OF THE DRAWINGS

The accompanying drawings are provided for a better understanding of the present disclosure and do not constitute a limitation to the present application.

DETAILED DESCRIPTION

Hereinafter, exemplary embodiments of the present application will be described in detail with reference to the accompanying drawings. Details of the embodiments are provided for a better understanding and are merely exemplary. It is apparent to those skilled in the art that the embodiments described herein may be modified without deviating from the scope and spirit of the present application. Moreover, for the sake of clarity and conciseness, description of well-known function and structure is omitted.

Embodiment 1

Figure 1:
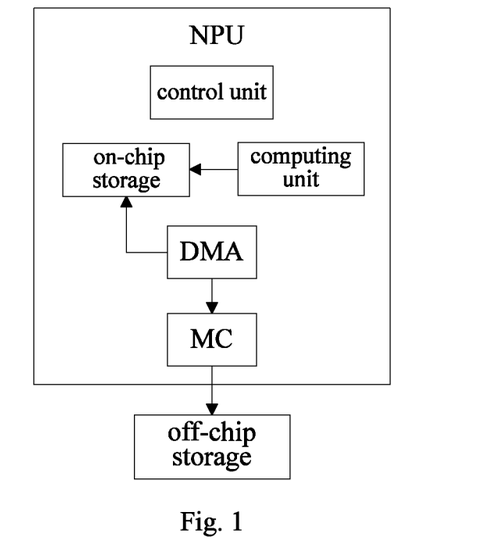
FIG. 1 is a structural block diagram of a NPU according to the present application.

The present application provides a matrix storage method, which can be applied to a matrix storage device, for example, to a processor of NPU. FIG. 1 provides a typical structural block diagram of NPU. As shown in FIG. 1, NPU usually includes control unit, computing unit, on-chip storage, Direct Memory Access (DMA), Memory Controller (MC) and off-chip storage. During operation of the NPU, DMA sends a memory access request to MC, MC accesses the off-chip storage to obtain neural network model and data to be processed, and writes the neural network model and data to be processed into the on-chip storage through DMA. Then, the computing unit accesses the on-chip storage to obtain data for calculation, and the calculation results can also be written to the on-chip storage and returned to the off-chip storage through DMA. The control unit is used to control the operation of the DMA and the computing unit.

Due to space limitation of the on-chip storage, during matrix calculation, NPU usually loads the data in the matrix in blocks instead of loading the whole row or column. That is, the data to be processed is typically not a data block of a row or a column in the matrix. Therefore, if the matrix is stored using the existing row storage or column storage manner, poor continuity of the address space in which the data to be processed is stored off-chip may be caused, resulting in a low matrix processing efficiency of NPU.

In view of above, the present application provides a matrix storage method to improve the matrix processing efficiency.

Figure 2:
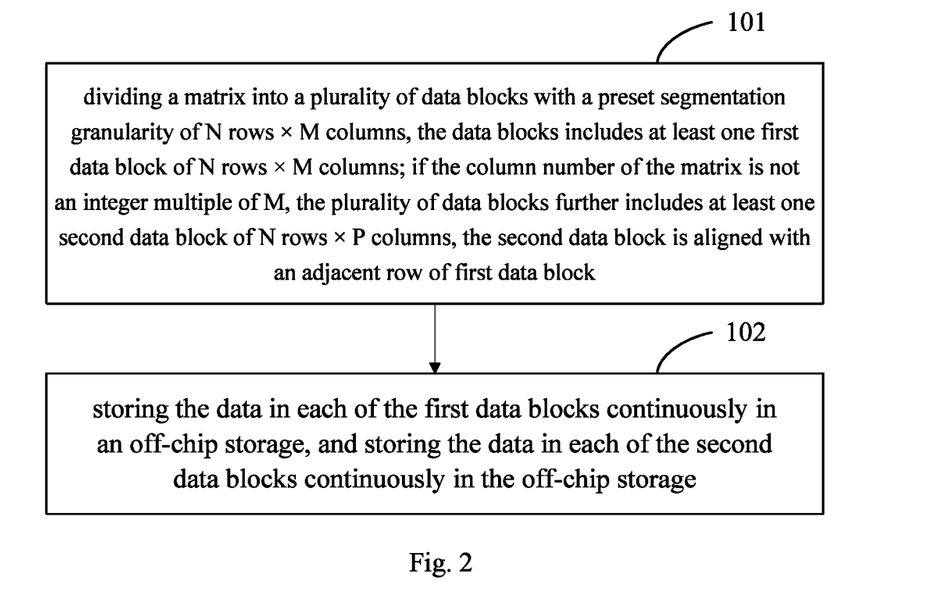
FIG. 2 is a flow chart of the matrix storage method according to an embodiment of the present application.

As shown in FIG. 2, the matrix storage method includes:

step 101, dividing a matrix into a plurality of data blocks with a preset segmentation granularity of N rows×M columns, at least one of N and M is greater than 1; the plurality of data blocks includes at least one first data block of N rows×M columns; if the column number of the matrix is not an integer multiple of M, the plurality of data blocks further includes at least one second data block of N rows×P columns, the second data block is aligned with an adjacent row of first data block, and P is less than M.

The above matrix may be a matrix which is stored off-chip, or a matrix to be stored off-chip. Before this step, the matrix storage apparatus may obtain the matrix in advance. The size of the matrix is not limited. It is assumed that the matrix is a matrix of A rows×B columns.

It should be understood that the number of rows and columns of the matrix are positive integers, the number of rows and columns of segmentation granularity, and the number of rows and columns of each data block are also positive integers.

In the present application, the term "segmentation" can be understood as division of data blocks, that is, the matrix is divided into multiple data blocks according to the segmentation granularity of N rows×M columns. The term "segmentation granularity" can be understood as the unit size of each block. If the row number of the matrix is exactly an integer multiple of N and the column number is an integral multiple of M, then the matrix can be divided into multiple data blocks evenly according to the segmentation granularity, and the size of each data block is equal to the segmentation granularity. In the present application, a data block having a block size equal to the segmentation granularity is referred to as a first data block, or a base data block.

Figure 3:
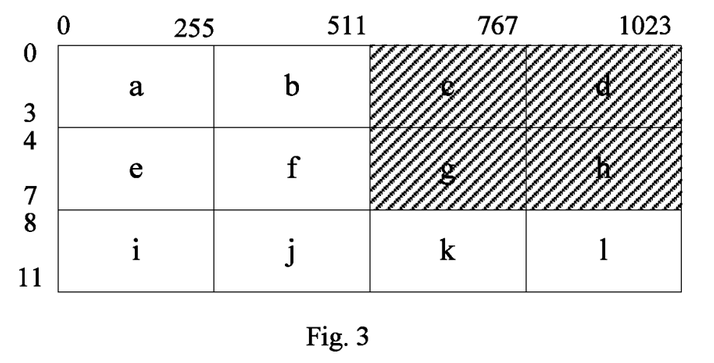
FIG. 3 is a schematic diagram showing the matrix segmentation according to the present application.

FIG. 3 shows an example in which the size of the matrix is exactly an integer multiple of the segmentation granularity. As shown in FIG. 3, taking a 12×1024 matrix as an example, assuming a segmentation granularity of 4×256, the matrix can be divided into 12 data blocks, namely data block a to data block l. The 12 data blocks are all first data blocks (or base data blocks). The size of each first data block is 4×256, and the size of the address space to be occupied by each first data block is 1 KB. The address space occupied by data block a is 0~1K, the address space occupied by data block b is 1K~2K, the address space occupied by data block c is 2K~3K, and so on.

Figure 4:
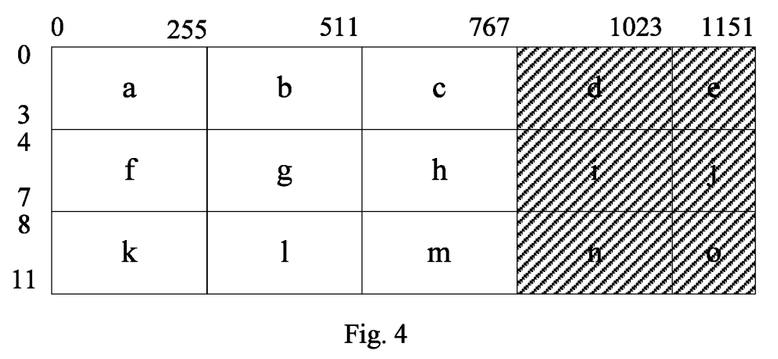
FIG. 4 is another schematic diagram showing the matrix segmentation according to the present application.

In addition, in some practical applications, the size of the matrix is not an integer multiple of the partition granularity, for example, the column number of the matrix B is not an integral multiple of M, or the row number A of the matrix is not an integer multiple of N. In this case, the matrix cannot be evenly divided into a number of first data blocks as shown in FIG. 3. In view of this, the present application provides the segmentation method shown in FIG. 4. As shown in FIG. 4, taking a 12×1152 matrix as an example, assuming that the segmentation granularity is 4×256, the matrix cannot be evenly divided. For the part ((0, 0), (11, 1023)) of the matrix, the segmentation method shown in FIG. 3 can be used to divide this part into 12 first data blocks evenly, that is, data block a to data block d, data block f to data block i, data block k to data block n. As for the part ((0, 1024), (11, 1151)) of the matrix, three second data blocks can be obtained, namely, data block e, data block j and data block o. Each of the second data blocks is aligned with an adjacent row of first data blocks, so the second data block may be referred to as an aligned data block. Each second data block has a size of 4×128, and the size of the address space to be occupied by each second data block is 0.5 KB.

In the present application, the size of the segmentation granularity may be set in advance as needed, for example, the segmentation granularity can be set according to the access requirements of the matrix, or the segmentation granularity can be set in advance according to the interleaving granularity of off-chip storage; the segmentation granularity can also be set in advance based on empirical parameters, and so on.

Step 102: storing the data in each of the first data blocks continuously in an off-chip storage, and storing the data in each of the second data blocks continuously in the off-chip storage.

After dividing the matrix, in order to improve continuity of the address space of the data to be accessed which is stored off-chip in the subsequent process of accessing the matrix data block, in this step, the data in each first data block is continuously stored in off-chip storage. In addition, in a case where the data block includes a second data block, the data in each second data block is continuously stored in off-chip storage.

The continuous storage of the data in the data block in the off-chip storage can be understood as an address remapping of the data in the data block, so that the data in a block occupies a continuous address in the address space. The first data block and the second data block can be understood as data blocks that have been remapped by addresses.

It should be noted that, when the data in each of the first data block or the second data block is continuously stored in off-chip storage, only the data in the same data block is required to be continuously stored, and whether the data between different data blocks need continuous storage is not limited in this application. For example, in FIG. 4, the data in data block a occupies a contiguous address of off-chip storage, and the data in data block b also occupies a contiguous address of off-chip storage, and whether the data in data block a and data block b occupy contiguous addresses is not limited in this application.

After storing the matrix to be stored in off-chip storage in the manner described above, when the matrix needs to be accessed, the accessed data block should contain a complete first data block or a complete second data block (in the presence of a second data block), so that the continuity of the accessed data in the address space can be improved. For example, as shown in FIG. 3, assuming that the accessed data block includes data block c, data block d, data block g, and data block h, that is, four complete first data blocks. In another example, as shown in FIG. 4, it is assumed that the accessed data blocks include data block d, data block e, data block i, data block j, data block n, and data block o, that is, three complete first data blocks and three complete second data blocks.

The above embodiments of the present application have the following advantages and beneficial effects: by dividing the matrix according to a preset segmentation granularity, and storing the data in the segmented first data block and the second data block (in the presence of a second data block) continuously in off-chip storage, the data blocks can be completely and continuously written to off-chip storage, and when the data blocks of the matrix need to be accessed, the entire data blocks which are continuously stored off-chip can be read, which improves the continuity of the accessed data in the address space. Due to the improvement of the continuity of the accessed data in the address space, reading speed of the data can be improved, thus the access efficiency can be improved. It can be seen that the matrix processing efficiency can be improved according to the above embodiments of the present application.

Optionally, if the row number of the matrix is not an integer multiple of N, the plurality of data blocks further include at least one third data block of L rows×S columns, and L is less than the N.

In some practical cases, the row number A of the matrix is not an integer multiple of N. In this case, the matrix cannot be divided into first data blocks and second data blocks (in the presence of a second data block) as shown in FIG. 3 or FIG. 4. At this time, after the matrix is divided into first data blocks and second data blocks, the remaining data block can be divided into at least one third data block, the row number L of each third data block is the row number of the remaining data block, and the value of the column number S is not limited. For example, the value of S can be equal to M, less than M or greater than M. When the value of S is equal to M, each third data block is aligned with the adjacent column of the first data blocks.

After the matrix is divided into first data blocks and second data blocks, since the row number of the remaining data blocks is generally small, and the row number of the third data block is also small, the storage mode of the third data block is not limited in the present application, that is, the third data block can be stored in off-chip storage by any suitable storage mode. For example, address remapping can be performed on the third data block or not performed on the third data block.

If the address remapping of the third data block is performed, the data in each third data block can be continuously stored in the off-chip storage. When the data block to be accessed includes the third data block, the continuity of the accessed data in the address space can be further improved. If the third data block is not subject to address remapping, the third data block can be understood as a data block without address remapping, or no remapping data block.

Since the row number of the third data block is generally small, and the data block to be accessed does not necessarily include a complete third data block, even if the third data block is address remapped, the optimization effect on memory access bandwidth is generally small. In view of this, whether or not to remap the address of the third data block is not limited in this application, so that the storage mode of the third data block has high flexibility.

Further, the number of the third data block is 1, and S is equal to the column number of the matrix.

After the matrix is divided into first data blocks and second data blocks, since the row number of the remaining data blocks is generally small, the remaining data block as a whole can be treated as a third data block. In this way, the matrix segmentation can be simplified.

Figure 5:
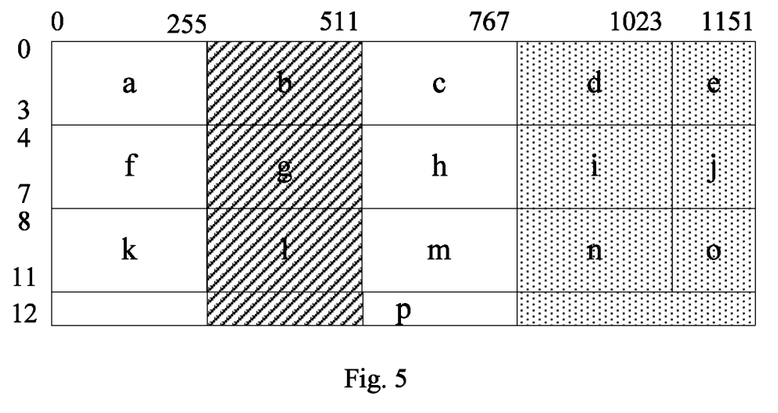
FIG. 5 is still another schematic diagram showing the matrix segmentation according to the present application.

As shown in FIG. 5, taking a 13×1152 matrix as an example, assuming that the segmentation granularity is 4×256, the matrix cannot be evenly divided. For the part ((0,0), (11,1151)) of the matrix, the segmentation method shown in FIG. 4 can be adopted to equally divide 12 first data blocks and 3 second data blocks, that is data block a to data block o. As for the part ((12,0), (12,1151)) of the matrix, a third data block can be divided, that is, data block p.

When the matrix is accessed, for example, DMA needs to load the block ((0,256), (12,511)) of the matrix, the data block b, the data block g, the data block l, and part of the data block p need to be read from the off-chip storage. Here, the storage address corresponding to the data of the partial data block p may be discontinuous, while the storage address of the other three data blocks is continuous, such that the accessed data in the off-chip storage has a good continuity in the address space.

Moreover, if DMA needs to load the block ((0,768), (12,1151)) of the matrix, the data block d, the data block e, the data block i, the data block j, the data block n, the data block o, and part of the data block p need to be read from the off-chip storage. Here, the storage address corresponding to the partial data block p may be discontinuous, while the storage address of the other six data blocks is continuous, such the accessed data in the off-chip storage has a good continuity in the address space.

Optionally, if the off-chip storage includes a plurality of storage channels, the segmentation granularity is an integral multiple of a storage granularity of each storage channel.

In order to facilitate various kinds of matrix-oriented computing, a large number of concurrent computing units are integrated in the NPU. Because the data path among DMA, on-chip storage and computing units is provided inside the NPU chip, high bandwidth can be easily achieved. However, the bandwidth of MC access to off-chip storage is limited by the formulated cycle of memory protocol standard and difficulty of physical implementation, so it is difficult to improve the single-channel access bandwidth, and the speed of DMA writing to on-chip storage is limited. The time for transferring the matrix to NPU may exceed the computing time, which eventually leads to a large amount of idle waiting time in the computing unit and affects the overall performance of NPU.

Figure 6:
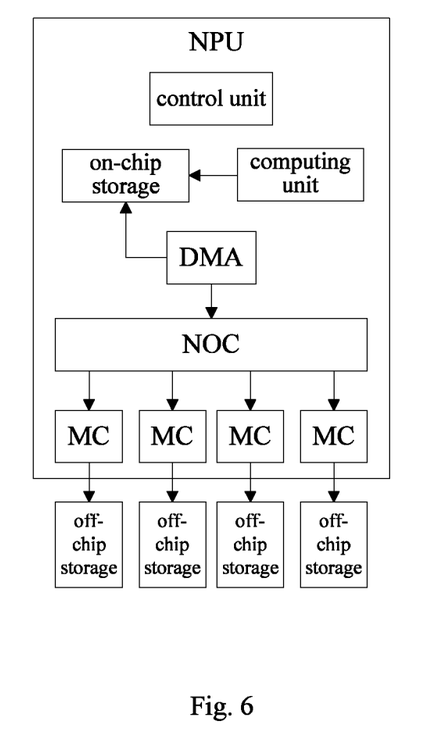
FIG. 6 is a structural block diagram of the NPU according to the present application which is integrated with multi-channel off-chip storage.

In order to solve the above problem, NPU is generally integrated with multi-channel off-chip storage to expand the memory access bandwidth. FIG. 6 provides a structure block diagram of NPU with integrated multi-channel off-chip storage, wherein Network on Chip (NOC) is an on-chip network, and the number of channels for off-chip storage is 4 (not limited to 4). With the integrated multi-channel off-chip storage, DMA can send memory access requests to NOC, and NOC can access multiple channels of off-chip storage concurrently through MC, which increases the overall off-chip memory access bandwidth for several times.

Figure 7:
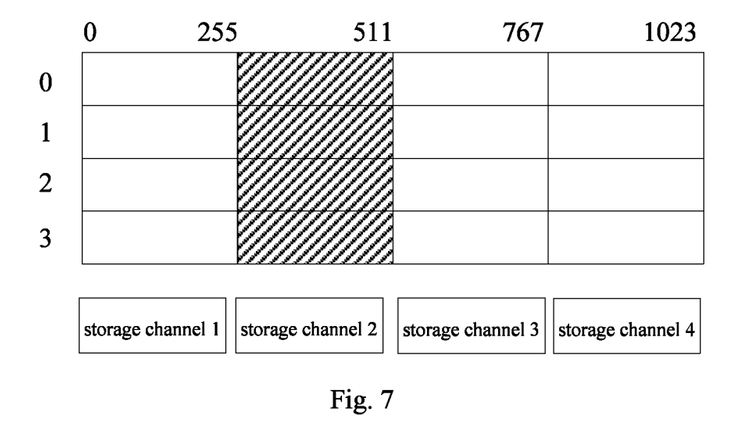
FIG. 7 is a schematic diagram showing the existing matrix storage manner.

However, in real scenarios, memory access requests may not be balanced among multiple channels, that is, memory access requests cannot cover multiple channels, in this case the multi-channel memory access bandwidth is not really utilized, thus a sufficient utilization of the actual off-chip storage bandwidth is not achieved. Taking the calculation operation of matrix (including vector) as an example, due to the limitation of on-chip storage space, the memory access instruction is generally sent to DMA, and the matrix is loaded in blocks into the on-chip storage for calculation. At present, the storage matrix usually adopts the manner of row storage or column storage, that is, the data of one row (or column) of the matrix is continuous in the address space, and the desired block data of the matrix can be easily addressed through the row storage (or column storage). However, it is not guaranteed that the data accessed at one time is continuous in the address space, and the accessed data may eventually be distributed to the storage of the same channel, so that DMA can only obtain a fraction of the designed data bandwidth. Here, NPU is assumed to be an off-chip storage with four storage channels, and the interleaving granularity of each channel is 256B. Supposing the NPU needs to load the block ((0,256), (3,511)) in the 4×1024 matrix as shown in FIG. 7, the matrix is stored in memory channels 0 to 3 respectively in row storage, while according to the multi-channel address interleaving rules of the matrix, the block ((0,256), (3,511)) of the matrix is only stored in the off-chip storage of storage channel 1. In this case, when the DMA of NPU loads this block, only ¼ of the off-chip storage bandwidth is actually utilized, while three storage channels are idle during this period.

In view of above, the present application provides a matrix storage method related to the multi-channel off-chip storage, i.e., if the off-chip storage includes a plurality of storage channels, the segmentation granularity is an integral multiple of a storage granularity of each storage channel. Here the term "storage granularity" means the interleaving granularity.

Assuming that NPU has an off-chip storage with four storage channels and a storage granularity of 256B, the address distribution is as follows: 256*0~256*1-1 are accessed through channel 0, 256*1~256*2-1 are accessed through channel 1, 256*2~256*3-1 are accessed through channel 2, 256*3~256*4-1 are accessed through channel 3, 256*4~256*5-1 are accessed through channel 0 . . . . In this way, as long as the accessed data is a continuous 1 KB in the address space, the NPU can access four channels concurrently, achieving the expected memory access bandwidth.

Since the segmentation granularity is an integral multiple of the storage granularity of a single storage channel, the size of each first data block is an integral multiple of the storage granularity of a single storage channel, so that since each access necessarily include a complete first data block, each access covers at least one storage channel, and when the number of accessed data blocks exceeds one, each access covers at least two storage channels. The coverage of each access to the storage channel is improved. The above integer multiples may be 1, 2, 3, 4, and so on. For the NPU with integrated off-chip storage of four storage channels shown in FIG. 6, the segmentation granularity can be four times of the storage granularity of a single storage channel, so that each first data block can cover all the storage channels, and the coverage of the storage channel is further improved.

In this embodiment, by associating the segmentation granularity of the matrix with the storage granularity of the storage channel of the off-chip storage, the coverage of each storage channel can be improved, thus the memory access bandwidth of the off-chip storage can be expanded, and the memory access bandwidth of all storage channels can be utilized as much as possible, so as to effectively improve the performance of the NPU.

It should be noted that the various optional implementations of the matrix storage methods according to the present application can be implemented either in combination with each other or separately, which is not limited herein.

The above embodiments of the present application have the following advantages or beneficial effects: before storing the matrix in the off-chip storage, the matrix is divided according to the preset segmentation granularity, and the data in the divided first data block and the second data block (in the presence of a second data block) are continuously stored in the off-chip storage. By using the above technical means, the data blocks can be completely and continuously written into the off-chip storage, and when the data blocks of the matrix are accessed, the data blocks continuously stored off-chip can be read as a whole, which improves the continuity of the accessed data in the address space. The matrix processing efficiency can be improved according to the above embodiments of the present application.

Embodiment 2

The present application further provides a matrix access method associated with the matrix storage method according to Embodiment 1, wherein the matrix to be accessed is stored in an off-chip storage using the matrix storage method according to Embodiment 1. The matrix access method can be used in a matrix access apparatus, e.g. a processor of NPU.

Figure 8:
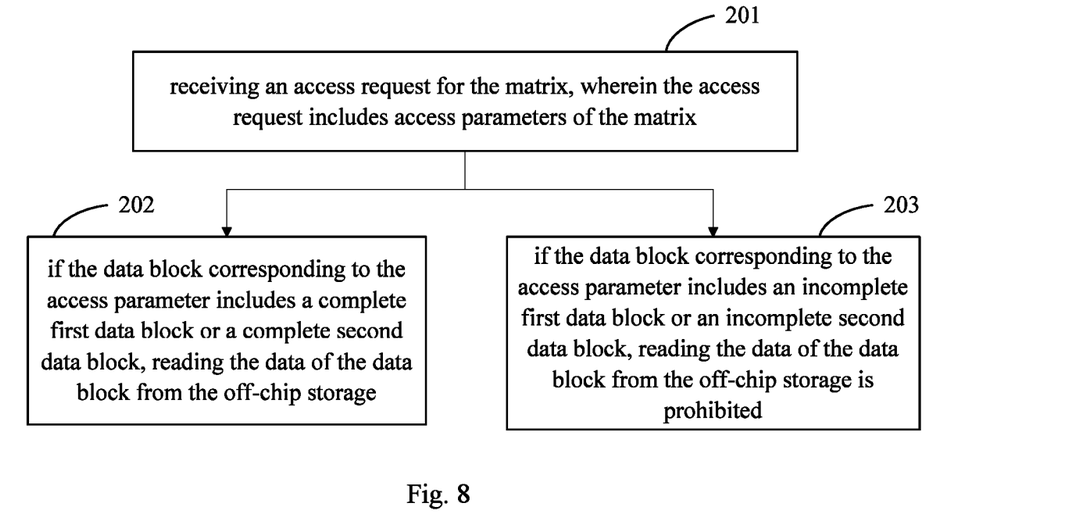
FIG. 8 is a flow chart of the matrix access method according to an embodiment of the present application.

As shown in FIG. 8, the matrix access method includes:

step 201, receiving an access request for the matrix, wherein the access request includes access parameters of the matrix;

step 202, if the data block corresponding to the access parameter includes a complete first data block or a complete second data block, reading the data of the data block from the off-chip storage;

step 203, if the data block corresponding to the access parameter includes an incomplete first data block or an incomplete second data block, reading the data of the data block from the off-chip storage is prohibited.

When a matrix stored in off-chip storage using the matrix storage method of Embodiment 1 is accessed, there are certain requirements for the size of the loaded data block, that is, the accessed data block must contain a complete first data block or a second data block (or only a partial third data block). If the accessed data block contains an incomplete first data block or an incomplete second data block, loading of the data block from off-chip storage is prohibited.

An example of matrix access process will be described in the following.

When the NPU needs to access the matrix, the DMA controller receives an access request for the matrix. The access request may include information about the matrix, such as a length m, a width n, a starting address base_addr of the matrix, as well as information about the data block to be accessed, such as a location index (m_start, n_start) of the upper left corner of the data block, a location index (m_end−1, n_end−1) of the lower right corner of the data block. It may also include information about the segmentation granularity, such as (blk_m,blk_n), which can also be understood as the length and width information of the first data block. The above information can be understood as access parameters, and the data blocks to be accessed in the matrix can be determined by the access parameters.

Then the DMA controller can determine whether the access parameters meet the requirements, that is, whether the data block corresponding to the access parameter contains a complete first data block or a complete second data block. Specifically, it can be judged whether the following equation is true: m_start % blk_m==0; n_start % blk_n==0; m_end % blk_m==0, or m_end==m; n_end % blk_n==0, or n_end==n. In general, blk_m and blk_n can be set to the power of 2 to facilitate judgment by hardware circuit. If the above equation is true, it indicates that the access parameters meet the requirements, otherwise the requirements are not met.

If the access parameters meet the requirements, access to the data blocks can be performed; if the access parameters do not meet the requirements, an error notification is returned.

Figure 9:
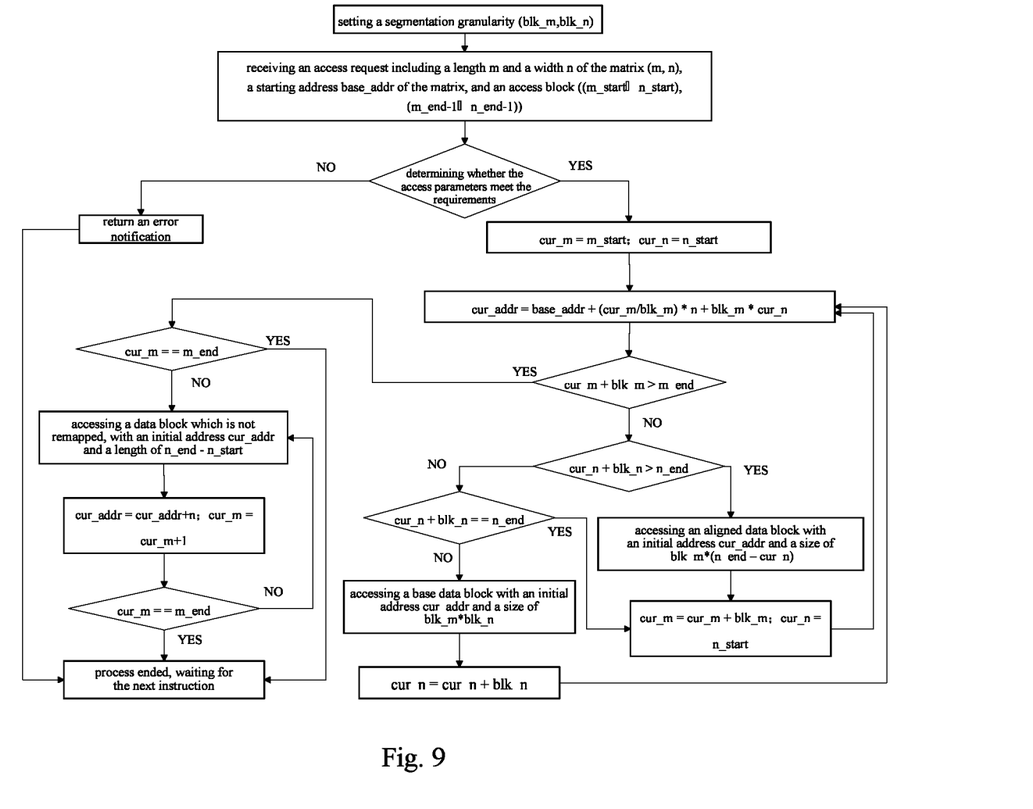
FIG. 9 is a schematic diagram showing the matrix access process according to the embodiment of the present application.

When accessing a data block, the type and parameters of the data block to be processed can be determined according to cur_m and cur_n. The initial value of cur_m is m_start and the initial value of cur_n is n_start. If the current data block to be processed is a first data block or a second data block, a continuous address space can be accessed to obtain the required data, and after the current data block is processed, cur_m and cur_n can be updated depending upon the type of the currently processed data block. If the current data block to be processed is the third data block, it is necessary to issue multiple segments of address to obtain the required data, then the access to the data block is completed and the process is ended. FIG. 9 shows an example of the entire process of matrix access.

It should be noted that the embodiments of the matrix access method in this application can be understood with reference to the relevant description of matrix access in Embodiment 1, and the like beneficial effects can be achieved, therefore a repetition thereof is omitted.

The above embodiment of the present application has the following advantages or beneficial effects: when the data blocks of the matrix is accessed, if the data block corresponding to the access parameter includes a complete first data block or a complete second data block, the data blocks are read from the continuous address space stored in the off-chip storage, and if the data block corresponding to the access parameter includes an incomplete first data block or an incomplete second data block, reading of the data blocks from the continuous address space stored in the off-chip storage is prohibited. By means of the above matrix access method, the data blocks continuously stored off-chip can be completely read, such that the continuity of accessed data in the address space can be improved. It can be seen that the above embodiments provided in the present application can improve the matrix processing efficiency.

Figure 10:
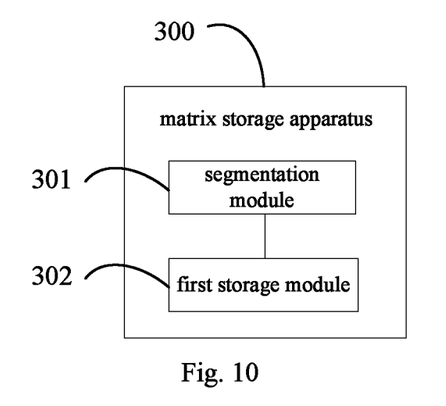
FIG. 10 is schematic structural diagram of the matrix storage apparatus according to an embodiment of the application.

The present application further provides a matrix storage apparatus, as shown in FIG. 10, the matrix storage apparatus 300 includes:

a segmentation module 301 for dividing a matrix into a plurality of data blocks with a preset segmentation granularity of N rows×M columns, at least one of N and M is greater than 1; the plurality of data blocks includes at least one first data block of N rows×M columns; if the column number of the matrix is not an integer multiple of M, the plurality of data blocks further includes at least one second data block of N rows×P columns, the second data block is aligned with an adjacent row of first data block, and P is less than M;

a first storage module 302 for storing the data in each of the first data blocks continuously in an off-chip storage, and storing the data in each of the second data blocks continuously in the off-chip storage.

Optionally, if the row number of the matrix is not an integer multiple of N, the plurality of data blocks further include at least one third data block of L rows×S columns, and L is less than the N.

Optionally, the number of the third data block is 1, and S is equal to the column number of the matrix.

Optionally, the matrix access apparatus 300 further includes:

a second storage module for storing the data in each of the third data blocks continuously in the off-chip storage.

Optionally, if the off-chip storage includes a plurality of storage channels, the segmentation granularity is an integral multiple of a storage granularity of each storage channel.

The matrix storage apparatus 300 according to the present application is capable of achieving the process of the above matrix storage method, and the same beneficial effects can be realized, a repetition thereof is omitted.

Figure 11:
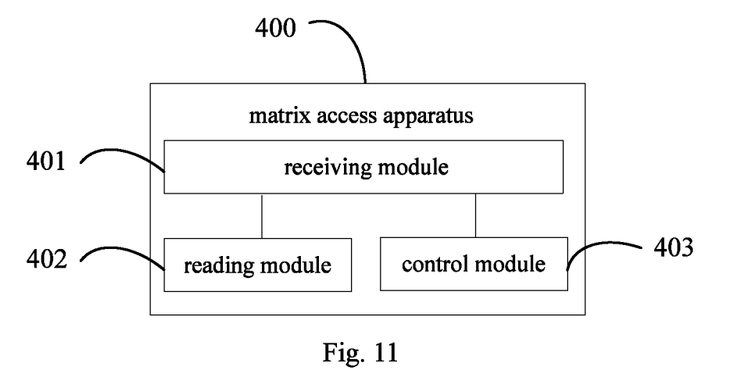
FIG. 11 is schematic structural diagram of the matrix access apparatus according to an embodiment of the application.

The present application further provides a matrix access apparatus 400 for accessing the matrix stored in the matrix storage apparatus 300, as shown in FIG. 11, the matrix access apparatus 400 includes:

a receiving module 401 for receiving an access request for the matrix, wherein the access request includes access parameters of the matrix;

a reading module 402 for reading the data of the data block from the off-chip storage if the data block corresponding to the access parameter includes a complete first data block or a complete second data block;

a control module 403 for prohibiting reading the data of the data block from the off-chip storage if the data block corresponding to the access parameter includes an incomplete first data block or an incomplete second data block.

The present application further provides an electronic device and a computer-readable storage medium.

Figure 12:
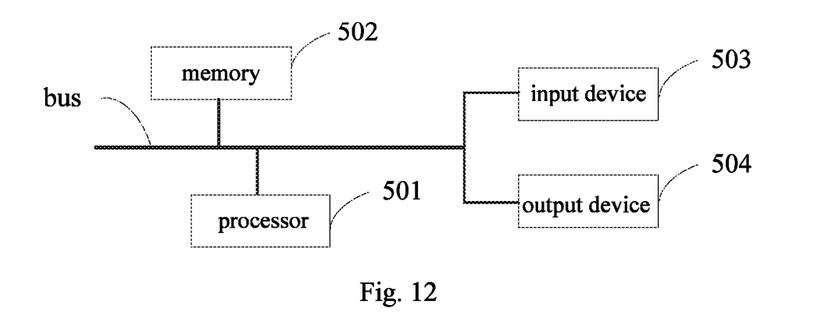
FIG. 12 is a block diagram of an electronic device for implementing the matrix storage method of the embodiment of the present application.

FIG. 12 is a block diagram of an electronic device for implementing the matrix storage method of the embodiment of the present application. The electronic devices are designed to represent various forms of digital computers, such as laptops, desktops, workstations, personal digital assistants, servers, blade servers, mainframes, and other suitable computers. The electronic devices can also represent various forms of mobile devices, such as personal digital processing, cellular phones, smart phones, wearable devices and other similar computing devices. The components, connections, relationships and their functions shown herein are used only as examples and are not intended to limit the implementation of the present application described and/or claimed herein.

As shown in FIG. 12, the electronic device includes one or more processors 501, memory 502, and an interface for connecting components, including a high-speed interface and a low-speed interface. The components are connected with each other using different bus and can be installed on a common motherboard or in other manner. The processor may process instructions executed within the electronic device, including instructions stored in or on the memory to display graphic information of the GUI on an external input/output device, such as a display device coupled to the interface. In other embodiments, a plurality of processors and/or buses may be used with a plurality of memories if necessary. Similarly, a plurality of electronic devices can be connected, and each device provides some of the necessary operations (for example, as a server array, a set of blade servers, or a multiprocessor system). An example of a processor 501 is shown in FIG. 12.

Memory 502 is the non-transient computer-readable storage medium provided in this application. The memory stores instructions that can be executed by at least one processor to cause the at least one processor to execute the matrix storage method provided by the present application. The non-transient computer-readable storage medium of the application stores computer instructions causing the computer to perform the matrix storage method provided in the present application.

The memory 502, as a non-transient computer-readable storage medium, can be used to store non-transient software programs, non-transient computer executable programs and modules, such as program instructions/modules corresponding to the matrix storage method in the embodiment of the present application (for example, the segmentation module 301 and the first storage module 302 shown in FIG. 10). The processor 501 executes various functional applications and data processing of the server by running non-transient software programs, instructions and modules stored in the memory 502, so as to perform the matrix storage method in the embodiment of the above method.

The memory 502 may include a storage program area and a storage data area, wherein the storage program area may store an operating system and applications required by at least one function; the storage data area may store data created by the electronic devices according to the matrix storage method. In addition, the memory 502 may include a high-speed random access memory and may also include a non-transient memory such as at least one of disk storage device, flash memory device or other non-transient solid-state memory device. In some embodiments, the memory 502 may optionally include a memory remotely set relative to the processor 501 which can be connected to the electronic device of the matrix storage method via a network. Examples of the above networks include, but are not limited to Internet, intranets, local area networks, mobile communication networks and combinations thereof.

The electronic device of the matrix storage method may also include an input device 503 and an output device 504. The processor 501, the memory 502, the input device 503 and the output device 504 may be connected by bus or other means, an example of bus connection is shown in FIG. 12.

The input device 503 may receive the input digital or character information and generate key signal inputs related to the user settings and functional control of the electronic device according to the matrix storage method, such as touch screen, keypad, mouse, trackpad, touchpad, indicator lever, one or more mouse buttons, trackball, joystick, etc. The output device 504 may include a display device, an auxiliary lighting device (e.g., LED) and a tactile feedback device (e.g., vibrating motor) and the like. The display device may include, but is not limited to, a liquid crystal display (LCD), a light emitting diode (LED) display and a plasma display. In some embodiments, the display device may be a touch screen.

Figure 13:
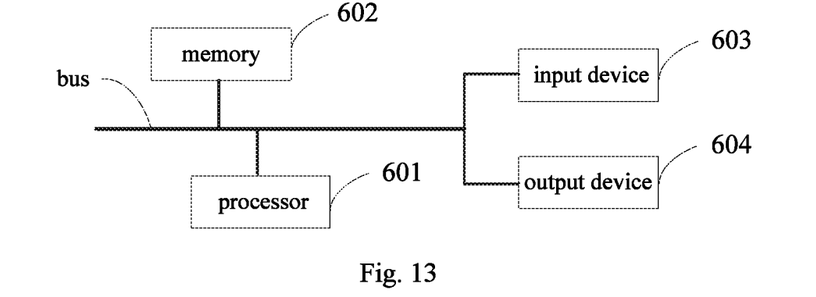
FIG. 13 is a block diagram of an electronic device for implementing the matrix access method of the embodiment of the present application.

FIG. 13 is a block diagram of an electronic device for implementing the matrix storage method of the embodiment of the present application. The electronic devices are designed to represent various forms of digital computers, such as laptops, desktops, workstations, personal digital assistants, servers, blade servers, mainframes, and other suitable computers. The electronic devices can also represent various forms of mobile devices, such as personal digital processing, cellular phones, smart phones, wearable devices and other similar computing devices. The components, connections, relationships and their functions shown herein are used only as examples and are not intended to limit the implementation of the present application described and/or claimed herein.

As shown in FIG. 13, the electronic device includes one or more processors 601, memory 602, and an interface for connecting components, including a high-speed interface and a low-speed interface. The components are connected with each other using different bus and can be installed on a common motherboard or in other manner. The processor may process instructions executed within the electronic device, including instructions stored in or on the memory to display graphic information of the GUI on an external input/output device, such as a display device coupled to the interface. In other embodiments, a plurality of processors and/or buses may be used with a plurality of memories if necessary. Similarly, a plurality of electronic devices can be connected, and each device provides some of the necessary operations (for example, as a server array, a set of blade servers, or a multiprocessor system). An example of a processor 601 is shown in FIG. 13.

Memory 602 is the non-transient computer-readable storage medium provided in this application. The memory stores instructions that can be executed by at least one processor to cause the at least one processor to execute the matrix storage method provided by the present application. The non-transient computer-readable storage medium of the application stores computer instructions causing the computer to perform the matrix storage method provided in the present application.

The memory 602, as a non-transient computer-readable storage medium, can be used to store non-transient software programs, non-transient computer executable programs and modules, such as program instructions/modules corresponding to the matrix storage method in the embodiment of the present application (for example, the segmentation module 401 and the first storage module 402 shown in FIG. 11). The processor 601 executes various functional applications and data processing of the server by running non-transient software programs, instructions and modules stored in the memory 602, so as to perform the matrix storage method in the embodiment of the above method.

The memory 602 may include a storage program area and a storage data area, wherein the storage program area may store an operating system and applications required by at least one function; the storage data area may store data created by the electronic devices according to the matrix storage method. In addition, the memory 602 may include a high-speed random access memory and may also include a non-transient memory such as at least one of disk storage device, flash memory device or other non-transient solid-state memory device. In some embodiments, the memory 602 may optionally include a memory remotely set relative to the processor 601 which can be connected to the electronic device of the matrix storage method via a network. Examples of the above networks include, but are not limited to Internet, intranets, local area networks, mobile communication networks and combinations thereof.

The electronic device of the matrix storage method may also include an input device 603 and an output device 604. The processor 601, the memory 602, the input device 603 and the output device 604 may be connected by bus or other means, an example of bus connection is shown in FIG. 12.

The input device 603 may receive the input digital or character information and generate key signal inputs related to the user settings and functional control of the electronic device according to the matrix storage method, such as touch screen, keypad, mouse, trackpad, touchpad, indicator lever, one or more mouse buttons, trackball, joystick, etc. The output device 604 may include a display device, an auxiliary lighting device (e.g., LED) and a tactile feedback device (e.g., vibrating motor) and the like. The display device may include, but is not limited to, a liquid crystal display (LCD), a light emitting diode (LED) display and a plasma display. In some embodiments, the display device may be a touch screen.

Various embodiments of the systems and techniques described herein may be implemented in digital electronic circuit systems, integrated circuit systems, application specific integrated circuits (ASIC), computer hardware, firmware, software, and/or combinations thereof. These embodiments may be implemented in one or more computer programs that may be executed and/or interpreted on a programmable system including at least one programmable processor, the programmable processor may be a dedicated or general-purpose programmable processor that can receive data and instructions from a storage system, at least one input device, and at least one output device, and transmit the data and instructions to the storage system, at least one input device and at least one output device.

These computing programs (also known as programs, software, applications, or codes) may include machine instructions for programmable processors, and these computing programs can be implemented using advanced processes and/or object-oriented programming languages, and/or assembly/machine languages. As used herein, the terms "machine-readable medium" and "computer-readable medium" refer to any computer program product, device, and/or apparatus for providing machine instructions and/or data to a programmable processor (e.g., magnetic disk, optical disc, memory, programmable logic device (PLD)), and a machine-readable medium that receives machine instructions as machine-readable signals. The term "machine readable signal" refers to any signal which is used to provide machine instructions and/or data to a programmable processor.

In order to provide interaction with the user, the system and techniques described herein can be implemented on a computer having a display device (such as cathode ray tube (CRT) or liquid crystal display (LCD) monitor) for displaying information to the user, and a keyboard and pointing device (e.g., a mouse or trackball) through which the user can provide input to the computer. Other types of devices can also be used to provide interaction with the user; for example, the feedback provided to the user may be any form of sensory feedback (e.g., visual feedback, auditory feedback, or tactile feedback); and input from the user in any form (including sound input, voice input or tactile input) can be received.

The systems and techniques described herein may be implemented in a computing system that includes background components (for example, a data server), or a computing system that includes middleware components (for example, an application server), or a computing system that includes front-end components (for example, a user computer with a graphical user interface or a web browser, where the user can interact through the graphical user interface or the web browser according to the embodiments of the systems and technologies described herein), or a computing system that includes any combination of such background components, middleware components, or front-end components. The components of the system can be connected to each other by digital data communication in any form or medium (for example, a communication network). Examples of communication networks include local area network (LAN), wide area network (WAN) and Internet.

A computer system may include clients and servers. Clients and servers are generally far away from each other and usually interact through communication networks. The relationship between the client and the server is established by running computer programs on the corresponding computers having a client-server relationship with each other.

According to the technical solutions in the embodiment of the present application, before storing the matrix in the off-chip storage, the matrix is divided according to the preset segmentation granularity, and the data in the segmented first data block and the second data block (in the presence of a second data block) are continuously stored in the off-chip storage. By using the above technical solutions, the data blocks can be completely and continuously written into the off-chip storage, and when the data blocks of the matrix are accessed, the data blocks continuously stored off-chip can be completely read, which improves the continuity of the accessed data in the address space.

It should be understood that steps shown above can be reordered, added, or deleted in various forms. For example, the steps recorded in the present application can be executed in parallel, sequentially or in different order, which is not limited herein as long as the expected results of the technical solutions disclosed in the present application can be achieved.

The protective scope of the present application is not limited by the above exemplary embodiments. It should be apparent to those skilled in the art that various modifications, combinations, sub-combinations and replacements may be made according to design requirements and other factors. Those modifications, equivalent replacements and improvements should be made without departing from the spirit and principle of the present disclosure, and shall fall within the scope of the present disclosure.

What is claimed is:

1. A matrix access method, applied to an electronic device comprising at least one processor and an off-chip storage which is connected to and in communication with the at least one processor, wherein the matrix is stored in an off-chip storage using a matrix storage method, comprising:
   dividing a matrix into a plurality of data blocks with a preset segmentation granularity of N rows×M columns, at least one of N and M is greater than 1; wherein the plurality of data blocks comprises at least one first data block of N rows×M columns; if the column number of the matrix is not an integer multiple of M, the plurality of data blocks further comprises at least one second data block of N rows×P columns, the second data block is aligned with an adjacent row of first data block, and P is less than M;
   storing the data in each of the first data blocks continuously in the off-chip storage, and storing the data in each of the second data blocks continuously in the off-chip storage,
   wherein the off-chip storage comprises a plurality of storage channels, and the segmentation granularity is an integral multiple of a storage granularity of each storage channel;
   the matrix access method comprising:
   receiving an access request for the matrix, wherein the access request comprises access parameters of the matrix;
   if the data block corresponding to the access parameter comprises a complete first data block or a complete second data block, reading the data of the data block from the off-chip storage;
   if the data block corresponding to the access parameter comprises an incomplete first data block or an incomplete second data block, reading the data of the data block from the off-chip storage is prohibited.

2. The method according to claim 1, wherein if the row number of the matrix is not an integer multiple of N, the plurality of data blocks further comprises at least one third data block of L rows×S columns, and L is less than N.

3. The method according to claim 2, wherein the number of the third data block is 1, and S is equal to the column number of the matrix.

4. The method according to claim 2, wherein the matrix storage method further comprises:
   storing the data in each of the third data blocks continuously in the off-chip storage.

5. The method according to claim 3, wherein the matrix storage method further comprises:
   storing the data in each of the third data blocks continuously in the off-chip storage.

6. The method according to claim 2, wherein the matrix access method comprising:
   receiving an access request for the matrix, wherein the access request comprises access parameters of the matrix;
   if the data block corresponding to the access parameter comprises a complete first data block or a complete second data block, reading the data of the data block from the off-chip storage;
   if the data block corresponding to the access parameter comprises an incomplete first data block or an incomplete second data block, reading the data of the data block from the off-chip storage is prohibited.

7. The method according to claim 3, wherein the matrix access method comprising:
   receiving an access request for the matrix, wherein the access request comprises access parameters of the matrix;
   if the data block corresponding to the access parameter comprises a complete first data block or a complete second data block, reading the data of the data block from the off-chip storage;
   if the data block corresponding to the access parameter comprises an incomplete first data block or an incomplete second data block, reading the data of the data block from the off-chip storage is prohibited.

8. The method according to claim 4, wherein the matrix access method comprising:
   receiving an access request for the matrix, wherein the access request comprises access parameters of the matrix;
   if the data block corresponding to the access parameter comprises a complete first data block or a complete second data block, reading the data of the data block from the off-chip storage;
   if the data block corresponding to the access parameter comprises an incomplete first data block or an incomplete second data block, reading the data of the data block from the off-chip storage is prohibited.

9. The method according to claim 5, wherein the matrix access method comprising:
   receiving an access request for the matrix, wherein the access request comprises access parameters of the matrix;
   if the data block corresponding to the access parameter comprises a complete first data block or a complete second data block, reading the data of the data block from the off-chip storage;

if the data block corresponding to the access parameter comprises an incomplete first data block or an incomplete second data block, reading the data of the data block from the off-chip storage is prohibited.

10. An electronic device, comprising:
    at least one processor; and
    a memory which is connected to and in communication with the at least one processor;
wherein, instructions that can be executed by the at least one processor are stored in the memory, the instructions are executed by the at least one processor to enable the at least one processor to perform the method according to claim 1.

11. An electronic device, comprising:
    at least one processor; and
    a memory which is connected to and in communication with the at least one processor;
wherein, instructions that can be executed by the at least one processor are stored in the memory, the instructions are executed by the at least one processor to enable the at least one processor to perform the method according to claim 2.

12. An electronic device, comprising:
    at least one processor; and
    a memory which is connected to and in communication with the at least one processor;
wherein, instructions that can be executed by the at least one processor are stored in the memory, the instructions are executed by the at least one processor to enable the at least one processor to perform the method according to claim 3.

13. An electronic device, comprising:
    at least one processor; and
    a memory which is connected to and in communication with the at least one processor;
wherein, instructions that can be executed by the at least one processor are stored in the memory, the instructions are executed by the at least one processor to enable the at least one processor to perform the method according to claim 4.

14. An electronic device, comprising:
    at least one processor; and
    a memory which is connected to and in communication with the at least one processor;
wherein, instructions that can be executed by the at least one processor are stored in the memory, the instructions are executed by the at least one processor to enable the at least one processor to perform the method according to claim 5.

15. An electronic device, comprising:
    at least one processor; and
    a memory which is connected to and in communication with the at least one processor;
wherein, instructions that can be executed by the at least one processor are stored in the memory, the instructions are executed by the at least one processor to enable the at least one processor to perform the method according to claim 1.

16. A non-transient computer-readable storage medium having computer instructions stored thereon, wherein the computer instructions are executed to cause the computer to perform the method according to claim 1.

17. A non-transient computer-readable storage medium having computer instructions stored thereon, wherein the computer instructions are executed to cause the computer to perform the method according to claim 2.

18. A non-transient computer-readable storage medium having computer instructions stored thereon, wherein the computer instructions are executed to cause the computer to perform the method according to claim 3.

19. A non-transient computer-readable storage medium having computer instructions stored thereon, wherein the computer instructions are executed to cause the computer to perform the method according to claim 4.

20. A non-transient computer-readable storage medium having computer instructions stored thereon, wherein the computer instructions are executed to cause the computer to perform the method according to claim 5.

* * * * *